US012326937B2

(12) United States Patent
Quinn et al.

(10) Patent No.: US 12,326,937 B2
(45) Date of Patent: Jun. 10, 2025

(54) REAL TIME INTRUSION DETECTION (71) Applicant: Dell Products, L.P., Hopkinton, MA (US)

(72) Inventors: Brett Quinn, Cotuit, MA (US); Douglas LeCrone, Hopkinton, MA (US); Denis J. Burt, Plymouth, MA (US); Paul Linstead, Shrewsbury, MA (US)

(73) Assignee: Dell Products, L.P., Hopkinton, MA (US)

( * ) Notice: Subject to any disclaimer, the term of this patent is extended or adjusted under 35 U.S.C. 154(b) by 173 days.

(21) Appl. No.: 18/241,310

(22) Filed: Sep. 1, 2023

(65) Prior Publication Data

US 2025/0077671 A1 Mar. 6, 2025

(51) Int. Cl.
*G06F 21/00* (2013.01)
*G06F 21/56* (2013.01)

(52) U.S. Cl.
CPC ...... *G06F 21/566* (2013.01); *G06F 2221/034* (2013.01)

(58) Field of Classification Search
CPC . G06F 21/566; G06F 21/552; G06F 2221/034
See application file for complete search history.

(56) References Cited

U.S. PATENT DOCUMENTS

2017/0142144 A1* 5/2017 Weinberger ......... H04L 63/1408
2023/0409707 A1* 12/2023 Xu ....................... G06F 21/564

* cited by examiner

*Primary Examiner* — Tri M Tran
(74) *Attorney, Agent, or Firm* — Anderson Gorecki LLP (57) ABSTRACT

Real Time Intrusion Detection (RTID) is implemented on a host computer by defining an Atypical Access Rate Detection (AARD) policy specifying storage volume access parameters configured to protect particular storage volumes maintained by a storage system for the host computer. An AARD application on the storage system monitors storage volume accesses based on the AARD policy. If a storage volume access is detected that is in violation of the AARD policy, the RTID application on the host computer is notified of the storage volume access. The RTID application on the host determines if the storage volume access was authorized or malicious. If the storage volume access was authorized, the RTID application re-issues the storage volume access and instructs the AARD application that the storage volume access is authorized. If the storage volume access was not authorized, the RTID application prevents the storage volume access to protect the storage volume.

18 Claims, 6 Drawing Sheets

REAL TIME INTRUSION DETECTION

FIELD

This disclosure relates to computing systems and related devices and methods, and, more particularly, to a method and apparatus for enabling real time intrusion detection.

SUMMARY

The following Summary and the Abstract set forth at the end of this document are provided herein to introduce some concepts discussed in the Detailed Description below. The Summary and Abstract sections are not comprehensive and are not intended to delineate the scope of protectable subject matter, which is set forth by the claims presented below.

All examples and features mentioned below can be combined in any technically possible way.

Real Time Intrusion Detection (RTID) is implemented on a host computer by defining an Atypical Access Rate Detection (AARD) policy specifying storage volume access parameters configured to protect particular storage volumes maintained by a storage system for the host computer. An AARD application on the storage system monitors storage volume accesses based on the AARD policy. If a storage volume access is detected that is in violation of the AARD policy, the RTID application on the host computer is notified of the storage volume access. The RTID application on the host determines if the storage volume access was authorized or malicious. In response to a determination that the storage volume access was authorized, the RTID application re-issues the storage volume access with an indication to the AARD application that the storage volume access is authorized. In response to a determination that the storage volume access was not authorized, the RTID application prevents the storage volume IO, to protect the storage volume from being accessed by a malicious application.

In some embodiments, a method of real time intrusion detection includes defining an atypical access rate detection policy by a real time intrusion detection application executing on a host computer, the atypical access rate detection policy specifying a set of logical storage volumes utilized by the host computer to read and write data to a storage system, passing the atypical access rate detection policy to an atypical access rate detection application executing on the storage system, using the content of the atypical access rate detection policy to identify tracks of physical storage resources allocated by the storage system to be used to store the data of the logical storage volumes, and monitoring the tracks of physical storage resources by the atypical access rate detection application. In response to a determination that an IO operation was received by the storage system on a location of the physical storage resources that is in contravention of the atypical access rate detection policy, blocking the IO operation by the atypical access rate detection application, and sending a notification by the atypical access rate detection application to the real time intrusion detection application to alert the real time intrusion detection application of the occurrence of the IO operation.

In some embodiments, the atypical access rate detection policy includes a set of write monitoring parameters identifying a set of read only logical storage volumes, and the step of monitoring tracks of physical storage resources by the atypical access rate detection application includes monitoring for occurrence of write operations on respective tracks of the physical storage resources that have been allocated by the storage system to store the set of read only logical storage volumes. In some embodiments, the set of read only logical storage volumes include software library directories and software directories containing software instances used by the host computer. In some embodiments, monitoring for occurrence of write operations on respective tracks of the physical storage resources that have been allocated by the storage system to store the set of read only logical storage volumes includes generating a write IO bitmap identifying tracks of physical storage that have received a write IO operation during a preceding time interval, and comparing the write IO bitmap with the respective tracks of the physical storage resources that have been allocated by the storage system to store the set of read only logical storage volumes to detect an anomalous write IO operation.

In some embodiments, the atypical access rate detection policy includes a set of read monitoring parameters identifying the logical storage volumes and respective logical storage volume read IO access rate parameters, and the step of monitoring tracks of physical storage resources by the atypical access rate detection application includes, for each logical storage volume, monitoring for occurrence of read IO operations on respective tracks of the physical storage resources that have been allocated by the storage system to store the logical storage volume that are in excess of a respective read IO access rate parameter for the logical storage volume.

In some embodiments, the method further includes receiving the notification by the real time intrusion detection application, and evaluating the IO operation by the real time intrusion detection application to determine if the IO operation was authorized. In response to a determination that the IO operation was authorized, reissuing the IO operation to the storage system with an indication to the atypical access rate detection application that the IO operation was authorized, and in response to a determination that the IO operation was not authorized, causing the IO operation to fail by the real time intrusion detection application. In some embodiments, the method further includes, in response to a determination that the IO operation was not authorized, instructing by the real time intrusion detection application to the atypical access rate detection application to take protective action to create and/or retain one or more snapshots of a respective logical storage volume associated with the unauthorized IO operation.

In some embodiments, the method further includes implementing a two-actor security mechanism at the atypical access rate detection application requiring two-actor concurrence in connection with setting or modifying the atypical access rate detection policy. In some embodiments, the two-actor security mechanism requires two authenticated and authorized individuals to interact with the atypical access rate detection application in connection with setting or modifying the atypical access rate detection policy used by the atypical access rate detection application to monitor the tracks of physical storage resources.

In some embodiments, a system for real time intrusion detection, includes one or more processors and one or more storage devices storing instructions that are operable, when executed by the one or more processors, to cause the one or more processors to perform a plurality of operations. In some embodiments, the operations include defining an atypical access rate detection policy by a real time intrusion detection application executing on a host computer, the atypical access rate detection policy specifying a set of logical storage volumes utilized by the host computer to read and write data to a storage system, passing the atypical access rate detection policy to an atypical access rate detection application executing on the storage system, and using the content of the atypical access rate detection policy to monitor physical storage resources allocated by the storage system to be used to store the data of the logical storage volumes. In response to a determination that an IO operation was received by the storage system on a location of the physical storage resources that is in contravention of the atypical access rate detection policy, blocking the IO operation by the atypical access rate detection application, and notifying the real time intrusion detection application of the occurrence of the IO operation.

In some embodiments, the atypical access rate detection policy includes a set of write monitoring parameters identifying a set of read only logical storage volumes, and the step of monitoring tracks of physical storage resources by the atypical access rate detection application includes monitoring for occurrence of write operations on respective tracks of the physical storage resources that have been allocated by the storage system to store the set of read only logical storage volumes. In some embodiments, the set of read only logical storage volumes include software library directories and software directories containing software instances used by the host computer. In some embodiments, monitoring for occurrence of write operations on respective tracks of the physical storage resources that have been allocated by the storage system to store the set of read only logical storage volumes includes generating a write IO bitmap identifying tracks of physical storage that have received a write IO operation during a preceding time interval, and comparing the write IO bitmap with the respective tracks of the physical storage resources that have been allocated by the storage system to store the set of read only logical storage volumes to detect an anomalous write IO operation.

In some embodiments, the atypical access rate detection policy includes a set of read monitoring parameters identifying the logical storage volumes and respective logical storage volume read IO access rate parameters, and the step of monitoring tracks of physical storage resources by the atypical access rate detection application includes, for each logical storage volume, monitoring for occurrence of read IO operations on respective tracks of the physical storage resources that have been allocated by the storage system to store the logical storage volume that are in excess of a respective read IO access rate parameter for the logical storage volume.

In some embodiments, the operations further include receiving the notification by the real time intrusion detection application, and evaluating the IO operation by the real time intrusion detection application to determine if the IO operation was authorized. In response to a determination that the IO operation was authorized, reissuing the IO operation to the storage system with an indication to the atypical access rate detection application that the IO operation was authorized, and in response to a determination that the IO operation was not authorized, causing the IO operation to fail by the real time intrusion detection application. In some embodiments, the operations further include, in response to a determination that the IO operation was not authorized, instructing by the real time intrusion detection application to the atypical access rate detection application to take protective action to create and/or retain one or more snapshots of a respective logical storage volume associated with the unauthorized IO operation.

In some embodiments, the operations further include implementing a two-actor security mechanism at the atypical access rate detection application requiring two-actor concurrence in connection with setting or modifying the atypical access rate detection policy. In some embodiments, the two-actor security mechanism requires two authenticated and authorized individuals to interact with the atypical access rate detection application in connection with setting or modifying the atypical access rate detection policy used by the atypical access rate detection application to monitor the tracks of physical storage resources.

DETAILED DESCRIPTION

Aspects of the inventive concepts will be described as being implemented in a storage system 100 connected to a host computer 102. Such implementations should not be viewed as limiting. Those of ordinary skill in the art will recognize that there are a wide variety of implementations of the inventive concepts in view of the teachings of the present disclosure.

Some aspects, features and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory tangible computer-readable medium. Furthermore, it will be understood by those of ordinary skill in the art that the computer-executable instructions may be executed on a variety of tangible processor devices, i.e., physical hardware. For ease of exposition, not every step, device or component that may be part of a computer or data storage system is described herein. Those of ordinary skill in the art will recognize such steps, devices, and components in view of the teachings of the present disclosure and the knowledge generally available to those of ordinary skill in the art. The corresponding machines and processes are therefore enabled and within the scope of the disclosure.

The terminology used in this disclosure is intended to be interpreted broadly within the limits of subject matter eligibility. The terms "logical" and "virtual" are used to refer to features that are abstractions of other features, e.g., and without limitation, abstractions of tangible features. The term "physical" is used to refer to tangible features, including but not limited to electronic hardware. For example, multiple virtual computing devices could operate simultaneously on one physical computing device. The term "logic" is used to refer to special purpose physical circuit elements, firmware, and/or software implemented by computer instructions that are stored on a non-transitory tangible computer-readable medium and implemented by multi-purpose tangible processors, and any combinations thereof.

Figure 1:
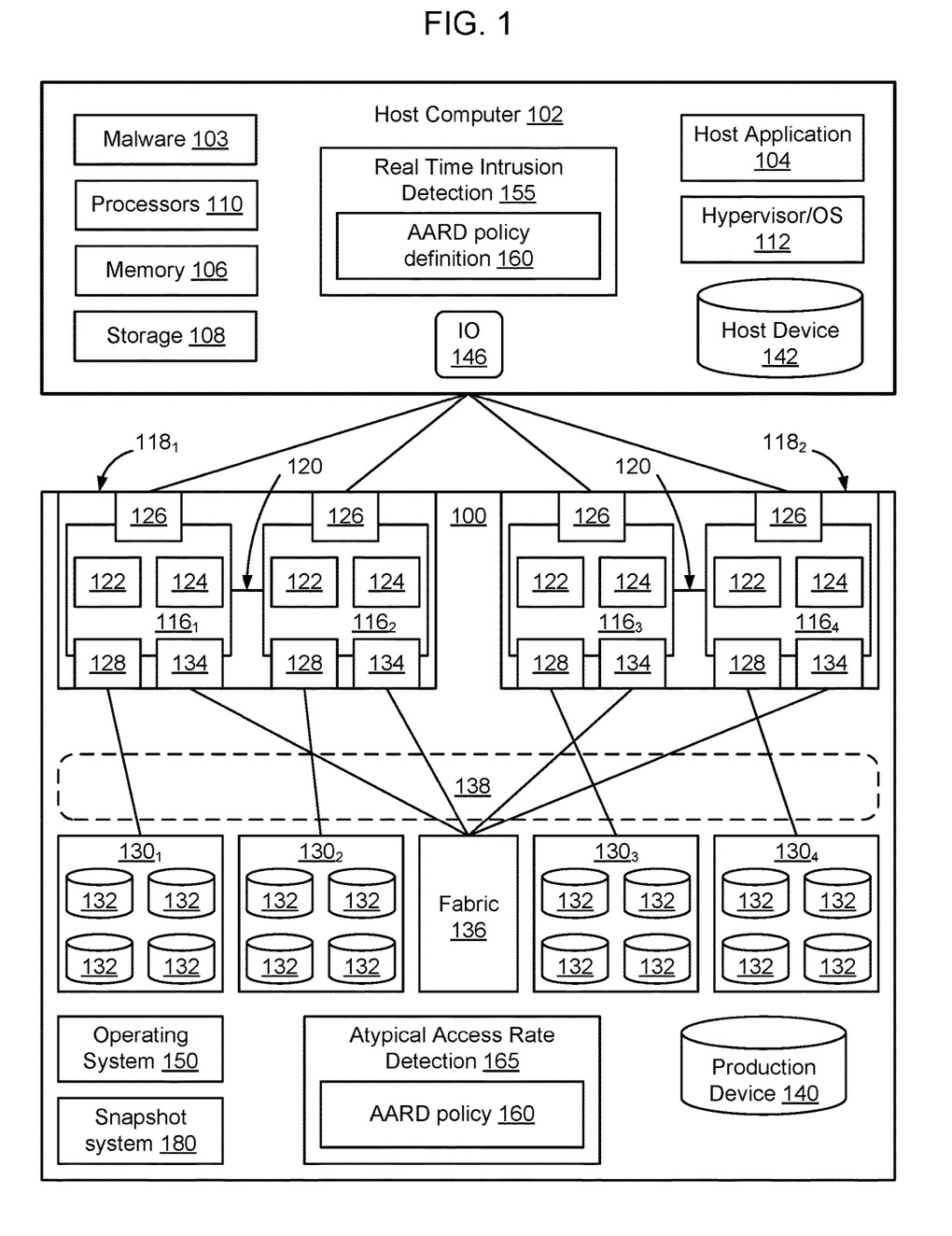
FIG. 1 is a functional block diagram of an example storage system connected to a host computer configured to implement real time intrusion detection, according to some embodiments.

FIG. 1 is a functional block diagram of an example storage system connected to a host computer configured to implement real time intrusion detection, according to some embodiments. FIG. 1 illustrates a storage system 100 and an associated host computer 102, of which there may be many. The storage system 100 provides data storage services for a host application 104, of which there may be more than one instance and type running on the host computer 102. In the illustrated example, the host computer 102 is a server with host volatile memory 106, persistent storage 108, one or more tangible processors 110, and a hypervisor or OS (Operating System) 112. The processors 110 may include one or more multi-core processors that include multiple CPUs (Central Processing Units), GPUs (Graphics Processing Units), and combinations thereof. The host volatile memory 106 may include RAM (Random Access Memory) of any type. The persistent storage 108 may include tangible persistent storage components of one or more technology types, for example and without limitation SSDs (Solid State Drives) and HDDs (Hard Disk Drives) of any type, including but not limited to SCM (Storage Class Memory), EFDs (Enterprise Flash Drives), SATA (Serial Advanced Technology Attachment) drives, and FC (Fibre Channel) drives. The host computer 102 might support multiple virtual hosts running on virtual machines or containers. Although an external host computer 102 is illustrated in FIG. 1, in some embodiments host computer 102 may be implemented as a virtual machine within storage system 100.

The storage system 100 includes a plurality of compute nodes $116_1$-$116_4$, possibly including but not limited to storage servers and specially designed compute engines or storage directors for providing data storage services. In some embodiments, pairs of the compute nodes, e.g. ($116_1$-$116_2$) and ($116_3$-$116_4$), are organized as storage engines 1181 and 1182, respectively, for purposes of facilitating failover between compute nodes 116 within storage system 100. In some embodiments, the paired compute nodes 116 of each storage engine 118 are directly interconnected by communication links 120. In some embodiments, the communication links 120 are implemented as a PCIe NTB. As used herein, the term "storage engine" will refer to a storage engine, such as storage engines 1181 and 1182, which has a pair of (two independent) compute nodes, e.g. ($116_1$-$116_2$) or ($116_3$-$116_4$). A given storage engine 118 is implemented using a single physical enclosure and provides a logical separation between itself and other storage engines 118 of the storage system 100. A given storage system 100 may include one storage engine 118 or multiple storage engines 118.

Each compute node, $116_1$, $116_2$, $116_3$, $116_4$, includes processors 122 and a local volatile memory 124. The processors 122 may include a plurality of multi-core processors of one or more types, e.g., including multiple CPUs, GPUs, and combinations thereof. The local volatile memory 124 may include, for example and without limitation, any type of RAM. Each compute node 116 may also include one or more front-end adapters 126 for communicating with the host computer 102. Each compute node $116_1$-$116_4$ may also include one or more back-end adapters 128 for communicating with respective associated back-end drive arrays $130_1$-$130_4$, thereby enabling access to managed drives 132. A given storage system 100 may include one back-end drive array 130 or multiple back-end drive arrays 130.

In some embodiments, managed drives 132 are storage resources dedicated to providing data storage to storage system 100 or are shared between a set of storage systems 100. Managed drives 132 may be implemented using numerous types of memory technologies for example and without limitation any of the SSDs and HDDs mentioned above. In some embodiments the managed drives 132 are implemented using NVM (Non-Volatile Memory) media technologies, such as NAND-based flash, or higher-performing SCM (Storage Class Memory) media technologies such as 3D XPoint and ReRAM (Resistive RAM). Managed drives 132 may be directly connected to the compute nodes $116_1$-$116_4$, using a PCIe (Peripheral Component Interconnect Express) bus or may be connected to the compute nodes $116_1$-$116_4$, for example, by an IB (InfiniBand) bus or fabric.

In some embodiments, each compute node 116 also includes one or more channel adapters 134 for communicating with other compute nodes 116 directly or via an interconnecting fabric 136. An example interconnecting fabric 136 may be implemented using PCIe (Peripheral Component Interconnect Express) or InfiniBand. Each compute node 116 may allocate a portion or partition of its respective local volatile memory 124 to a virtual shared memory 138 that can be accessed by other compute nodes 116 over the PCIe NTB links.

The storage system 100 maintains data for the host applications 104 running on the host computer 102. For example, host application 104 may write data of host application 104 to the storage system 100 and read data of host application 104 from the storage system 100 in order to perform various functions. Examples of host applications 104 may include but are not limited to file servers, email servers, block servers, and databases.

Logical storage devices are created and presented to the host application 104 for storage of the host application 104 data. For example, as shown in FIG. 1, a production device 140 and a corresponding host device 142 are created to enable the storage system 100 to provide storage services to the host application 104.

The host device 142 is a local (to host computer 102) representation of the production device 140. Multiple host devices 142, associated with different host computers 102, may be local representations of the same production device 140. The host device 142 and the production device 140 are abstraction layers between the managed drives 132 and the host application 104. From the perspective of the host application 104, the host device 142 is a single data storage device having a set of contiguous fixed-size LBAs (Logical Block Addresses) on which data used by the host application 104 resides and can be stored. However, the data used by the host application 104 and the storage resources available for use by the host application 104 may actually be maintained by the compute nodes $116_1$-$116_4$ at non-contiguous addresses (tracks) on various different managed drives 132 on storage system 100.

In some embodiments, the storage system 100 maintains metadata that indicates, among various things, mappings between the production device 140 and the locations of extents of host application data in the virtual shared memory 138 and the managed drives 132. In response to an IO (Input/Output command) 146 from the host application 104 to the host device 142, the hypervisor/OS 112 determines whether the IO 146 can be serviced by accessing the host volatile memory 106. If that is not possible then the IO 146 is sent to one of the compute nodes 116 to be serviced by the storage system 100.

In the case where IO 146 is a read command, the storage system 100 uses metadata to locate the commanded data, e.g., in the virtual shared memory 138 or on managed drives 132. If the commanded data is not in the virtual shared memory 138, then the data is temporarily copied into the virtual shared memory 138 from the managed drives 132 and sent to the host application 104 by the front-end adapter 126 of one of the compute nodes $116_1$-$116_4$. In the case where the IO 146 is a write command, in some embodiments the storage system 100 copies a block being written into the virtual shared memory 138, marks the data as dirty, and creates new metadata that maps the address of the data on the production device 140 to a location to which the block is written on the managed drives 132.

Hosts 102, such as mainframe (z/OS) computer systems, store data using storage resources of the storage systems 100. Malware attacks may occur on this data, for example by encrypting the data using a secret key and then requiring payment to decrypt the data.

Cyber resiliency solutions encompass many layers of functionality based on the National Institute of Standards Cyber Security Framework elements of Identify, Protect, Detect, Respond, and Recover. While all these elements are important to deploy in a robust cyber resiliency solution, perhaps the most important, and most difficult to realize, is the "detect" element. For example, read access to critical data elements in an environment outside of normal usage patterns can be an indicator of cyber theft. Recognizing when suspicious access to data is occurring, in real time, provides the user with the opportunity to take corrective action immediately, rather than reacting to corrupted data discovered days later, for example when analyzing backup data for evidence of corruption.

A common attack vector for a cyber-attack is to insert malicious code in application or system software libraries. The malicious code may lie dormant for a period of time before taking action to corrupt or steal data. It is important to capture such insertion in real time and to provide notice that the code change has occurred or has been attempted, so that corrective action to remove the suspect code can be taken before the malicious code activates to corrupt or steal data. While it is possible to detect access to such libraries and code using host software monitoring mechanisms, authorized users, acting alone, can defeat this type of monitoring and instrumentation. Specifically, a rogue user who is authorized to work on the software but who has malicious intent, can disable the host monitoring software prior to inserting the malicious code, to thereby circumvent the host monitoring processes. Accordingly, it would be advantageous to provide a solution that provides notification of either read or write access to critical infrastructure or data elements independent of the host environment.

According to some embodiments, a storage system 100 has the ability to create bit maps to track which tracks on a logical storage volume have been accessed. Such tracking can be enabled by a host application that reads and resets these bit maps at regular intervals and captures them for analysis by the host application, to enable the host application to determine if the access rate is normal or abnormal for a dataset or volume at any particular time window. As used herein, the host application is referred to herein as an "Real Time Intrusion Detection" (RTID) application 155. According to some embodiments, an Atypical Access Rate Detection (AARD) application 165 is implemented on the storage system 100, and used to detect storage volume access operations, compare the storage volume access operations with AARD policies 160 defined by the RTID application 155, and to report any access operations that are outside or otherwise in violation of an AARD policy 160 to the RTID application 155 on the host 102.

In some embodiments, the Real Time Intrusion Detection (RTID) application 155 is an application on the host 102 that is configured to instruct the storage system 100 to send notifications to the host 102 if tracks that contain critical software infrastructure elements, such as load libraries, are updated. In some embodiments, the RTID application 155 creates AARD policies 160 that are passed to the AARD application 165 executing on the storage system 100, to specify read and write policies to be used to define monitoring conditions implemented by the AARD application 165. Using the AARD policies 160, the AARD application 165 monitors IO operations and generates alerts, in real time, when IO operations in violation of an AARD policy 160 are detected by the AARD application 165. In some embodiments, notifications from the AARD application 165 occur in real time as the update IO is being executed, and are provided to the real time intrusion detection application 155.

In response to receipt of a notification, the RTID application 155 at the host 102 is configured to take action on the storage system 100. One example action includes approving the IO operation and reissuing the IO operation. Another example action includes denying the IO operation and blocking implementation of the IO operation at the host operating system 112, to thereby prevent the IO operation from executing on the storage system 100 in real time. In some embodiments, additional actions by the RTID application 155 also include instructing the storage system 100 to preserve one or more snapshots of the data of the storage volume that was targeted by the IO operation, or instructing a snapshot creation subsystem 180 of the storage system 100 to open a consistency window and create a snapshot of the data of a set of one or more the storage volumes.

In some embodiments, the AARD policies 160 specify both storage volumes that are write protected and also specify read access policies on sets of storage volumes. The read access policies enable the AARD application 165 to monitor read operations on the storage volumes to detect atypical access rates on storage volumes, which can provide a real-time alert of a cyber-attack. By providing a RTID application 155 on the host that is designed to interact with an AARD application 165 on the storage system 100, it is possible to obtain real-time alerts from the storage system 100 whenever data is being altered or accessed, when the data should not be altered or accessed. In this manner, it is possible to provide real-time intrusion detection to enhance the ability to defeat cyber-attacks, for example by preventing malware from obtaining access to corrupt or steal data stored on the storage system 100.

In some embodiments, to prevent a single user from altering the protection settings associated with the RTID application 155, a two-actor security mechanism is enabled and disabled at the AARD application 165 on the storage system 100. For example, in some embodiments the AARD application 165 is accessed via a vendor service interface to set AARD policies 160 on the storage system 100 and to modify AARD policies 160 on the storage system 100. In some embodiments, two-actor security is required to set or modify an AARD policy 160 on the storage system 100. This causes the RTID configuration settings implemented using the AARD policy 160 from being changed by a single actor, thus enforcing involvement by two authorized users in connection with any modification to an AARD policy 160, and hence preventing a single rogue employee from modifying the AARD policy 160 to enable insertion of malicious code. Although some embodiments are described in which two-actor security is used to protect AARD policies 160 on the storage system 100 or to turn off the AARD application 165, in some embodiments other security mechanisms may also be utilized, such as requiring involvement of customer service before allowing any such modification.

Figure 2:
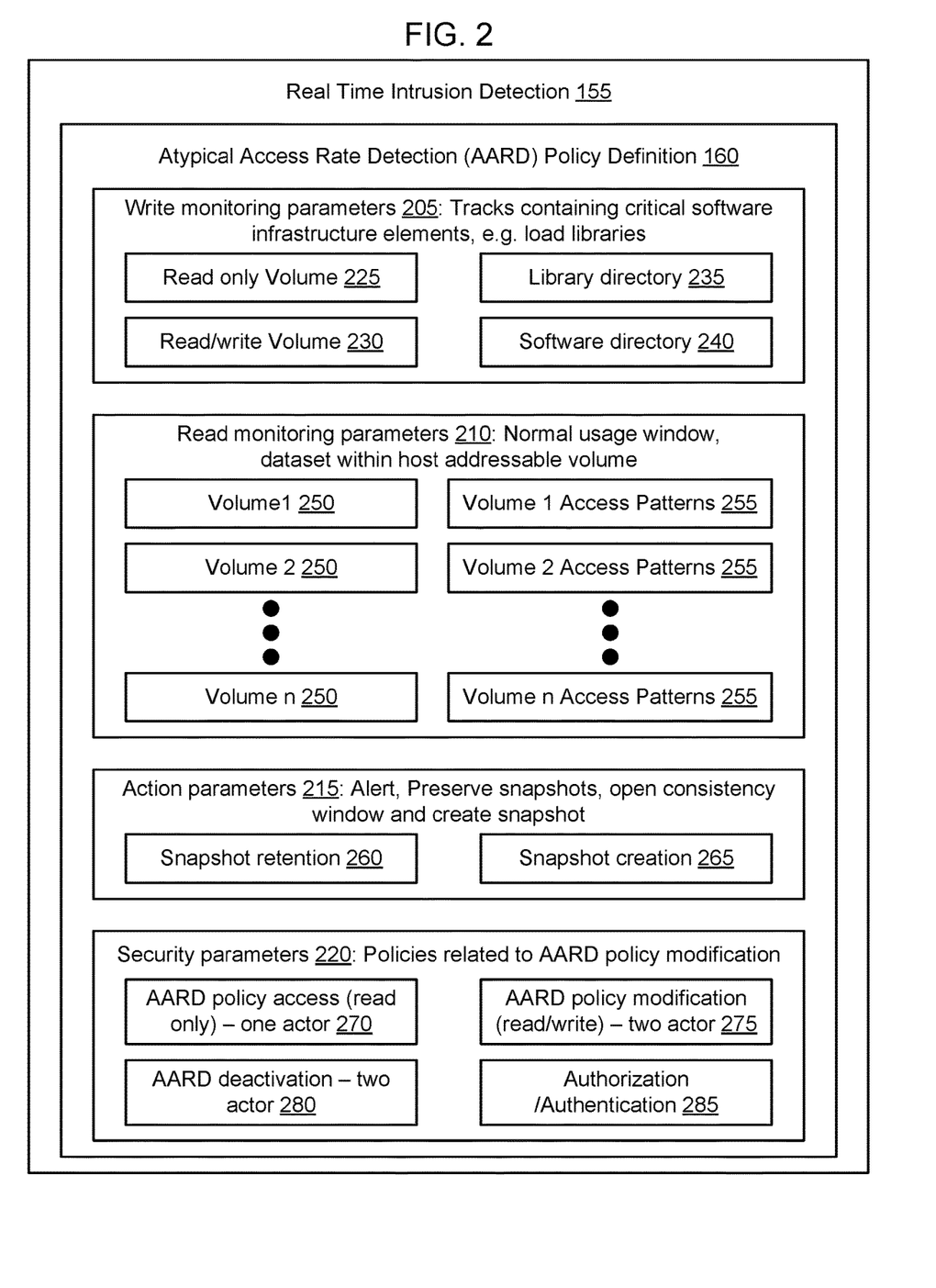
FIG. 2 is a block diagram of an example real time intrusion detection application showing an example atypical access rate detection policy definition in greater detail, according to some embodiments.

FIG. 2 is a block diagram of an example RTID application 155 showing an example AARD policy 160 definition in greater detail, according to some embodiments. As shown in FIG. 2, in some embodiments the RTID application 155 is used to create AARD policy definitions 160. The AARD policies 160, once created, are passed to the AARD application 165 on the storage system 100 and used by the AARD application 165 to monitor access operations on storage volumes identified in the AARD policy 160. Although FIG. 2 shows some aspects of an example AARD policy 60, it should be understood that different embodiments might include different aspects or additional aspects of items to be monitored by the AARD application 165, and accordingly the particular AARD policy 160 will depend on the particular implementation.

In the example shown in FIG. 2, in some embodiments the AARD policy definition 160 includes information about write monitoring parameters 205, read monitoring parameters 210, action parameters 215, and security parameters 220. Optionally, in some embodiments the security parameters 220 may be specified independent of the AARD policies 160, for example as configuration settings that are implemented directly on the RTID application 155 and/or AARD application 165. However, for ease of explanation, FIG. 2 shows the AARD policy 160 as including security parameters 220.

As shown in FIG. 2, in some embodiments the write monitoring parameters 205 are configured to specify logical storage volumes used by the host 102 that contain critical software such as library directories 235 and software directories 240. These directories specify locations where software is maintained by the storage system 100 on behalf of the host 102. By monitoring IO operations on tracks associated with these logical storage volumes, the storage system 100 is able to detect a software or library modification operation which is then reported by the AARD application 165 to the RTID application 155. Monitoring the physical storage locations used to implement these logical storage volumes thus allows the storage system 100 to provide an alert whenever a software update is implemented or whenever a library is updated, to thus provide a real-time alert of the possibility of malware injection into the host's critical software infrastructure.

In some embodiments, the write monitoring parameters 205 further include information about read only logical volumes 225 and read/write logical volumes 230. Optionally, these write monitoring parameters 205 might include time-based restrictions or other restrictions, such as a total number of IO operations per time period that are expected on the storage volumes. By specifying one or more sets of logical volumes 225, 230 in the write monitoring parameters 205, the RTID application 155 is able to specify the logical storage volumes used by the host 102, to thereby instruct the AARD application 165 to monitor write operations on the tracks associated with the logical volumes 225, 230, and to include the write operations in periodic reports provided by the AARD application 165 to the RTID application 155.

In some embodiments, the read monitoring parameters 210 include a set of logical storage volumes 250 and a set of associated access patterns 255. The access pattern definitions 255, in some embodiments, include time based volumetric expected read IO operation definitions, which specify thresholds for generation of alerts based on unusual read IO activity on particular logical storage volumes 250. For example, a particular storage volume might only be expected to receive frequent read operations during business hours, whereas another storage volume might only be expected to receive frequent read operations in connection with backup operations that occur overnight. By specifying the set of storage volumes 250 and respective volumetric access patterns 255, the RTID application 155 is able to instruct the AARD application 165 to monitor read operations on the tracks associated with the logical volumes 250 and to include the detected read operations in periodic reports provided by the AARD application 165 to the RTID application 155. By specifying logical storage volume access patterns 255, the RTID application 155 is able to instruct the AARD application 165 to monitor read operations on the tracks associated with the logical volumes 250 and to generate an alert any time the volume of read operations on a particular logical volume 250 exceeds the corresponding specified access pattern 255. Although an example storage volume access pattern 255 has been described in which the storage volume access pattern 255 specifies an access frequency, it should be understood that the storage volume access patterns 255 may specify other aspects of storage access that should be identified as well. For example, a storage volume access pattern 255 might specify data access sequentiality patterns such as identifying data access operations that are abnormally sequential, data access breadth patterns that are associated with unique data access operations over a large range of address space, or numerous other data access patterns that could be associated with malicious data access.

In some embodiments, the action parameters 215 specify when an alert should be generated and when additional actions should be taken to protect data maintained by the storage system 100. For example, in some embodiments, the action parameters 215 specify whether an alert should be generated in connection with individual write monitoring parameters 205 and individual read monitoring parameters 210. For example, as part of the volume access pattern definitions 255, an associated action parameter 215 may be specified to instruct the AARD application 165 that a violation of the storage volume access pattern 255 should result in the immediate generation of an alert to the RTID application 155. The action parameters 215 also specify, in some embodiments, the frequency with which bitmaps 305, 310 (see FIG. 3) identifying data access operations should be reported back to the RTID application 155 in the absence of abnormal storage volume access. The action parameters 215, in some embodiments, also specify whether the AARD application 165 should cause the snapshot subsystem 180 to retain particular snapshots of the relevant storage volume 260 and whether the AARD application 165 should cause the snapshot subsystem 180 to create a current snapshot of one or more relevant storage volumes in response to detected violations of one or more of the monitoring parameters specified in the AARD policy 260.

In some embodiments, the AARD policy definition 160 includes security parameters 220 although, as noted above, the security parameters 220 may also be set directly on the AARD application 165 and/or directly in the RTID application 155. In either event, in some embodiments the security parameters 220 include a first security level 270 required to obtain read only access to an AARD policy 160 on the AARD application 165. In some embodiments, obtaining read only access to an AARD policy 160 to determine the content of the AARD policy 160 on the AARD application 165 is implemented using a single actor security mechanism. This enables a single actor to view the AARD policy 160, for example, to ascertain whether the current AARD policy 160 correctly lists all of the various software and library directories and other storage volumes, etc., required to protect the host from a malware attack.

In some embodiments the security parameters 220 include a second security level 275 required to access and modify an AARD policy 160 on the AARD application 165. If a single actor were to be able to modify an AARD policy 160, the single actor could, for example, change the AARD policy 160 to stop the AARD application 165 from monitoring write operations on the library directories 235 or from monitoring write operations on the software directories 240. This would provide the single actor with the ability to pause write IO monitoring by the AARD application 165 while the single actor engaged in the act of inserting malicious code into the critical software infrastructure. By requiring two-actor security mechanism 275 in connection with disabling or modifying an AARD policy 160, it is possible to enable the AARD application 165 to guard against malicious modification of the AARD policy 160, thus providing enhanced security against an inside attack on the host's critical software infrastructure.

Similar to modification of an AARD policy 160, in some embodiments the security parameters 220 include a security parameter 280 requiring a two-actor security mechanism for deactivation of the AARD application 165. This prevents a single actor from disabling the AARD application 165. Optionally, as shown in FIG. 2, the security parameters 220 may also specify authorization and/or authentical information 285 which specify, for example, which employees are authorized to participate in the one-actor security mechanism 270 or the two-actor security mechanisms 275, 280, as well as a level of authentication required to prove the identity of those individuals before action is enabled by the individuals on the AARD application 165.

Figure 3:
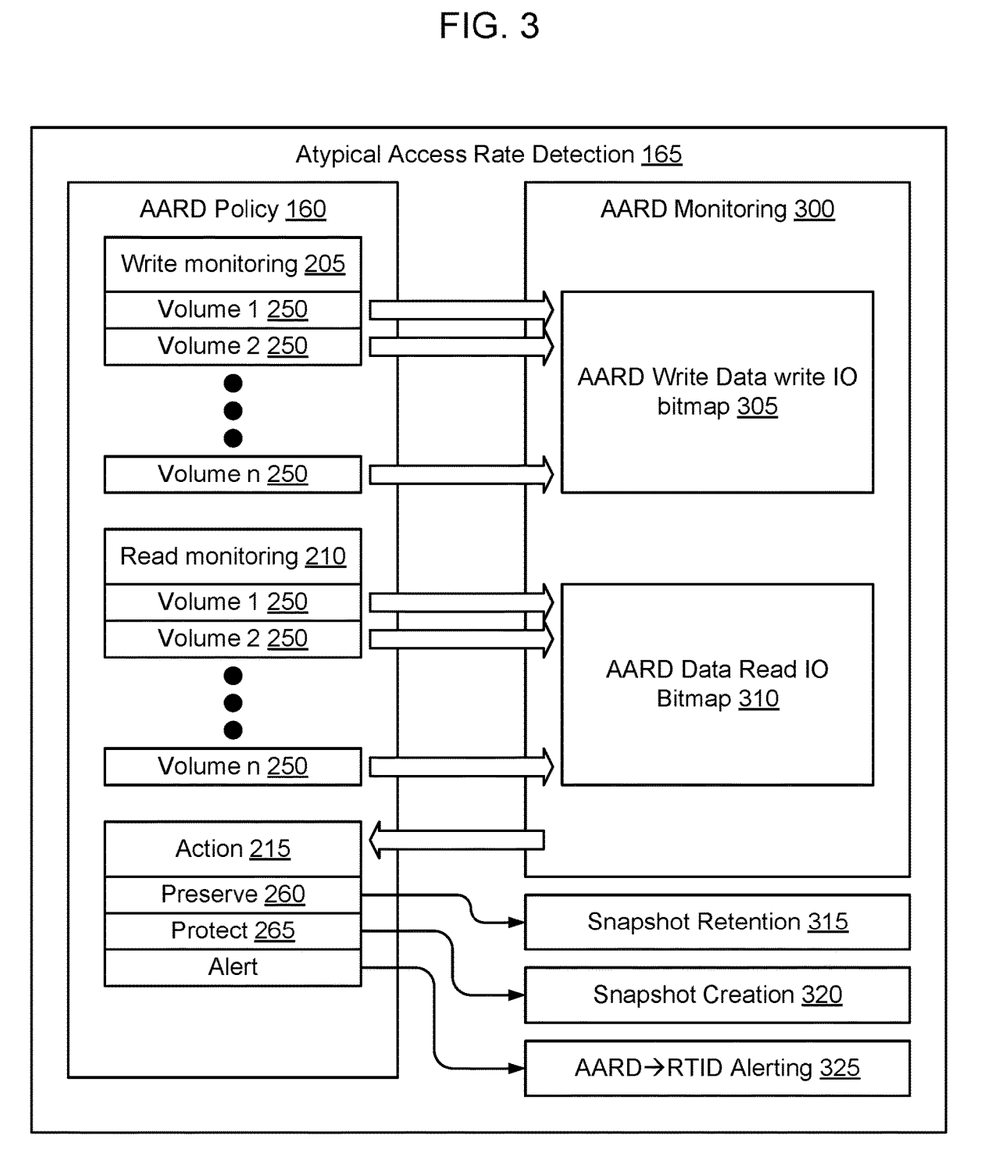
FIG. 3 is a block diagram of an example atypical access rate detection application, according to some embodiments.

FIG. 3 is a block diagram of an example AARD application 165, according to some embodiments. As shown in FIG. 3, in some embodiments the AARD application 165 uses AARD policy 160 to identify a set of physical tracks of storage associated with the logical storage volumes specified in the AARD policy 160. An AARD monitoring process 300 detects IO operations on the tracks and creates read IO bitmap 305 and write IO bitmap 310 identifying tracks of the storage volumes 250 that have experienced read and write IO operations. For example, in some embodiments the AARD monitoring process 300 creates two bitmaps—an AARD write data write IO bitmap 305, and an AARD read data read IO bitmap 310. These bitmaps 305, 310 identify which tracks have been written or read recently. The bitmaps 305, 310 are periodically compared with the storage volume access parameters 225 and 255 specified in the AARD policies 160, to identify any violation of any of the write monitoring parameters 205 or read monitoring parameters 210. In some embodiments, the comparison between the bitmaps 305, 310 and the corresponding monitoring parameters 205, 210, is done locally by the AARD application 165. In some embodiments, the bitmaps 305, 310 are reported by the AARD application 165 to the RTID application 155 and the comparison between the bitmaps 305, 310 and the corresponding monitoring parameters 205, 210, is done at the host by the RTID application 155.

When an anomaly is identified, the action parameters 215 are used by the AARD application 165 to implement actions, including snapshot creation 320, snapshot retention 315, and alert generation 325.

Figure 4:
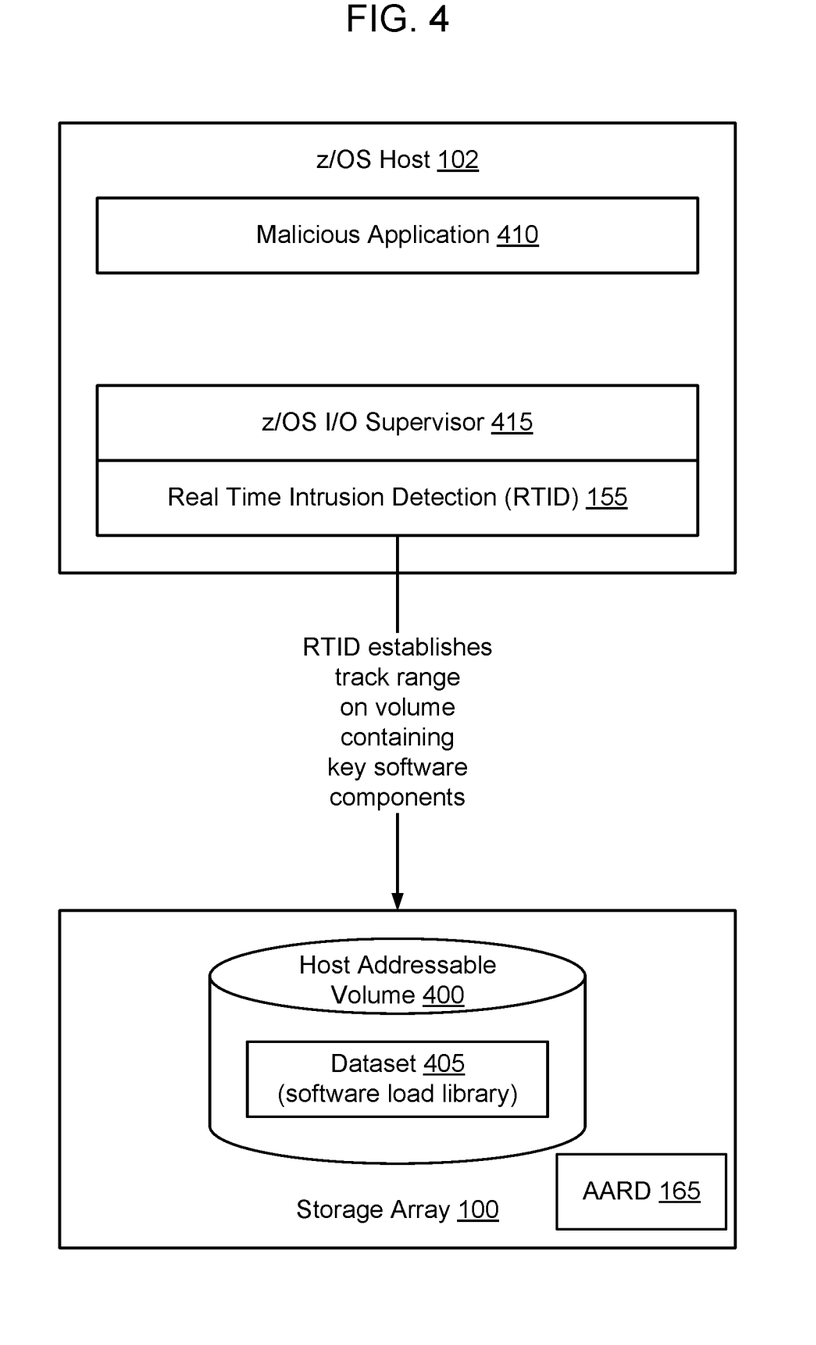
FIG. 4 is a block diagram showing an example interaction between a host and a storage system to set an atypical access rate detection policy by the host on the storage system, according to some embodiments.

FIG. 4 is a block diagram showing an example interaction between a host 102 and a storage system 100 in connection with setting an AARD policy 160 on the AARD application 165 on the storage system 100, according to some embodiments. As shown in FIG. 4, initially the RTID application 155 creates an AARD policy 160 which is installed in an AARD application 165 executing on the storage system 100. By creating and installing the AARD policy 160, the RTID application 155 establishes, for example, a track range on a host-addressable storage volume 400 on the storage system that contains a particular dataset 405, which in this example is used to store a portion of the host's critical software infrastructure such as a software load library. Once the AARD application 165 receives the AARD policy 160, the AARD application 165 monitors the storage locations of physical storage that contain the dataset 405 to identify any write IO operations on regions of physical storage resources 130 that contain the dataset 405. In this manner, the AARD application 165 is able to detect and alert the RTID application 155 whenever there is a change to one of the tracks of physical storage resources, which would be indicative of a change to the software load library contained in the dataset 405.

Figure 5:
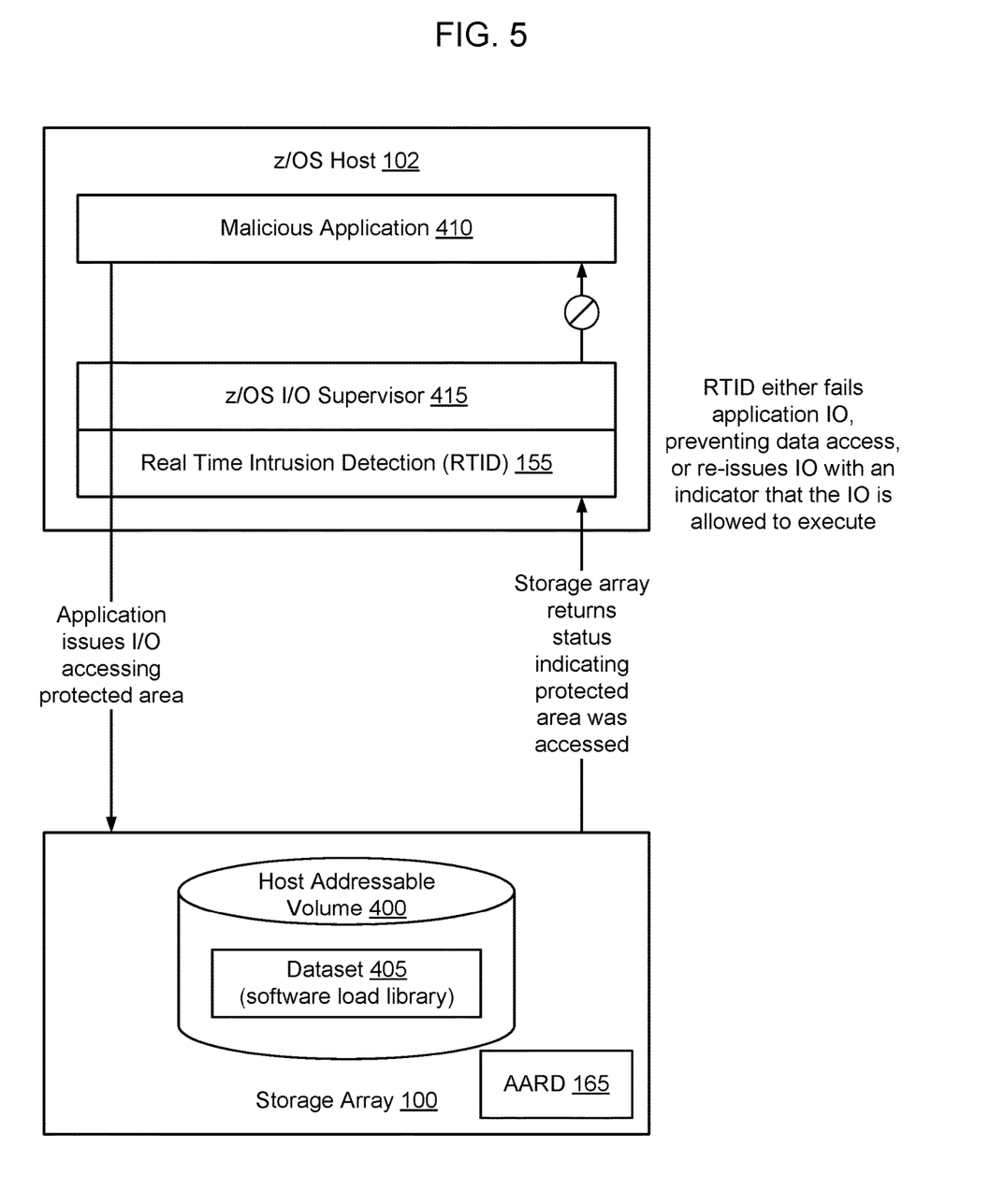
FIG. 5 is a block diagram showing an example interaction between a host and a storage system in response to detection of a storage volume access in violation of the atypical access rate detection policy, according to some embodiments.

FIG. 5 is a block diagram showing an example interaction between a host and a storage system in response to detection of a storage volume access in violation of the AARD policy 160, according to some embodiments. As shown in FIG. 5, if a malicious application 410 issues an IO to attempt to access (write) to a protected area, such as the dataset 405 containing the software load library, the AARD application 165 will detect the write IO on the protected area of physical storage resources 130 and will return a status alert indicating that the protected area 405 was accessed. In response to receipt of the alert from the AARD application 165, the RTID application 155 either fails the write IO if the write IO was unauthorized, or re-issues the write IO with an indicator to the AARD that the IO is authorized and should be allowed to execute.

For example, in some embodiments, in response to a determination by the RTID application 155 that the write IO on the protected region 405 was generated by a malicious application 410, the RTID application 155 is configured to cause the z/OS IO supervisor 415 to fail the write IO and prevent future IO operations by the malicious application 410. In some embodiments, in response to a determination by the RTID application 155 that the write IO on the protected region 405 was legitimate, for example issued in connection with a known modification to the software load library, the RTID application 155 is configured to reissue the IO with an indicator to the AARD application 165 that the write IO is an allowed write IO.

Figure 6:
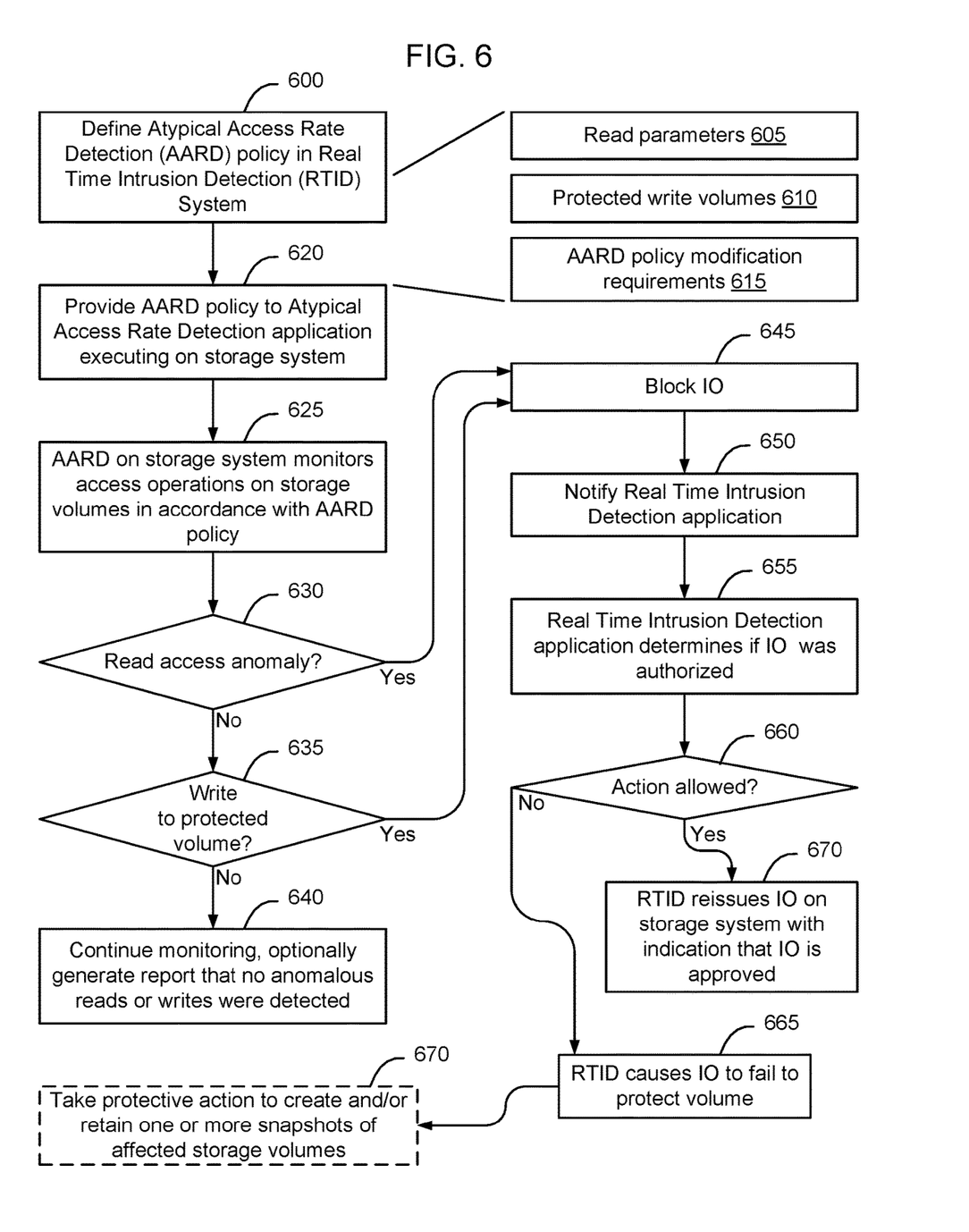
FIG. 6 is a flowchart of an example process of real time intrusion detection, according to some embodiments.

FIG. 6 is a flowchart of an example process of real time intrusion detection, according to some embodiments. As shown in FIG. 6, in some embodiments an AARD policy 160 is defined (block 600), for example using a RTID application 155 executing on a host 102, which specifies particular read parameters 210 (block 605), write parameters 205 such as protected write volumes 225 (block 610), and optionally security parameters 215 (block 615). Additional details associated with example AARD policies 160 are described in greater detail, for example, in connection with FIG. 2.

The AARD policy 160 is provided to an AARD application 165 executing on the storage system 100 that is monitoring access to storage volumes by the host 102 (block 620). The AARD policy 160 is used by the AARD application 165 to monitor tracks of physical memory 130 associated with the logical volumes identified in the AARD policy 160 (block 625).

In some embodiments, the AARD application 165 uses the AARD policy 160 to determine occurrence of a read access anomaly (block 630) and to determine occurrence of a write access anomaly (block 635). In response to a determination that no read access anomaly has occurred (a determination of NO at block 630) and that no write access anomaly has occurred (a determination of NO at block 635), the AARD application 165 continues monitoring IO operations on the tracks (block 640). Optionally, the AARD application 165 periodically generates alerts identifying the tracks that were accessed and indicating that no anomalous read IO operations and no anomalous write IO operations have been detected.

In response to a determination that an anomalous read IO operation has been detected (a determination of YES at block 630) or in response to a determination that an anomalous write IO operation has been detected (a determination of YES at block 635) the IO is prevented from being implemented (block 645) and the RTID application is notified (block 650). Although FIG. 6 has been drawn with block 630 above block 635, it should be understood that the AARD application 165 may implement blocks 630 and 635 in either order, and that the AARD application 165 may similarly implement blocks 630 and 635 simultaneously.

In response to receipt of a notification from the AARD application 165, the RTID application 155 determines if the read and/or write IO operation is authorized (block 655) and, accordingly, whether the action should be allowed (block 660). In response to a determination that the read and/or write IO operation should be allowed (a determination of YES at block 660), the RTID reissues the read and/or write IO operation on the storage system 100 with an indication that the read and/or write IO operation has been evaluated by the RTID application 155 and approved by the RTID application 155 (block 670). In response to a determination that the read and/or write IO operation is not authorized (a determination of NO at block 660), the RTID causes the read and/or write IO operation to fail to protect the storage volume. For example, in connection with a write IO operation, preventing the write IO operation from being implemented can be used to prevent the write IO operation from changing a write protected logical storage volume on the storage system 100 (block 665). Optionally, additional protective action may also be implemented, such as retaining or creating one or more snapshots of the associated logical storage volume (block 670).

In embodiments where anomaly detection is implemented by the RTID application 155, the AARD application 165 periodically generates reports, for example containing bitmaps 305, 310, that identify the monitored access operations (result of block 625), that are transmitted to the RTID application 155. The anomaly detection operations of blocks 630 and 635 are then implemented by the RTID application 155, enabling the notification process of block 650 to be eliminated. The RTID application 155, in some embodiments, uses messaging to the AARD application to cause suspicious IO operations to be blocked (block 645) until a determination can be made by the RTID application 155 as to whether particular actions should be allowed (blocks 655, 660).

The methods described herein may be implemented as software configured to be executed in control logic such as contained in a CPU (Central Processing Unit) or GPU (Graphics Processing Unit) of an electronic device such as a computer. In particular, the functions described herein may be implemented as sets of program instructions stored on a non-transitory tangible computer readable storage medium. The program instructions may be implemented utilizing programming techniques known to those of ordinary skill in the art. Program instructions may be stored in a computer readable memory within the computer or loaded onto the computer and executed on computer's microprocessor. However, it will be apparent to a skilled artisan that all logic described herein can be embodied using discrete components, integrated circuitry, programmable logic used in conjunction with a programmable logic device such as a FPGA (Field Programmable Gate Array) or microprocessor, or any other device including any combination thereof. Programmable logic can be fixed temporarily or permanently in a tangible non-transitory computer readable medium such as random-access memory, a computer memory, a disk drive, or other storage medium. All such embodiments are intended to fall within the scope of the present invention.

Throughout the entirety of the present disclosure, use of the articles "a" or "an" to modify a noun may be understood to be used for convenience and to include one, or more than one of the modified noun, unless otherwise specifically stated. The term "about" is used to indicate that a value includes the standard level of error for the device or method being employed to determine the value. The use of the term "or" in the claims is used to mean "and/or" unless explicitly indicated to refer to alternatives only or the alternatives are mutually exclusive, although the disclosure supports a definition that refers to only alternatives and to "and/or." The terms "comprise," "have" and "include" are open-ended linking verbs. Any forms or tenses of one or more of these verbs, such as "comprises," "comprising," "has," "having," "includes" and "including," are also open-ended. For example, any method that "comprises," "has" or "includes" one or more steps is not limited to possessing only those one or more steps and also covers other unlisted steps.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A method of real time intrusion detection, comprising:
defining an atypical access rate detection policy by a real time intrusion detection application executing on a host computer, the atypical access rate detection policy specifying a set of logical storage volumes utilized by the host computer to read and write data to a storage system;
passing the atypical access rate detection policy to an atypical access rate detection application executing on the storage system;

using the content of the atypical access rate detection policy to identify tracks of physical storage resources allocated by the storage system to be used to store the data of the logical storage volumes; and monitoring the tracks of physical storage resources by the atypical access rate detection application;

in response to a determination that an IO operation was received by the storage system on a location of the physical storage resources that is in contravention of the atypical access rate detection policy, blocking the IO operation by the atypical access rate detection application, and sending a notification by the atypical access rate detection application to the real time intrusion detection application to alert the real time intrusion detection application of the occurrence of the IO operation.

2. The method of claim 1, wherein the atypical access rate detection policy includes a set of write monitoring parameters identifying a set of read only logical storage volumes, and wherein the step of monitoring tracks of physical storage resources by the atypical access rate detection application comprises monitoring for occurrence of write operations on respective tracks of the physical storage resources that have been allocated by the storage system to store the set of read only logical storage volumes.

3. The method of claim 2, wherein the set of read only logical storage volumes comprises software library directories and software directories containing software instances used by the host computer.

4. The method of claim 2, wherein monitoring for occurrence of write operations on respective tracks of the physical storage resources that have been allocated by the storage system to store the set of read only logical storage volumes comprises generating a write IO bitmap identifying tracks of physical storage that have received a write IO operation during a preceding time interval, and comparing the write IO bitmap with the respective tracks of the physical storage resources that have been allocated by the storage system to store the set of read only logical storage volumes to detect an anomalous write IO operation.

5. The method of claim 1, wherein the atypical access rate detection policy includes a set of read monitoring parameters identifying the logical storage volumes and respective logical storage volume read IO access rate parameters, and wherein the step of monitoring tracks of physical storage resources by the atypical access rate detection application comprises, for each logical storage volume, monitoring for occurrence of read IO operations on respective tracks of the physical storage resources that have been allocated by the storage system to store the logical storage volume that are in excess of a respective read IO access rate parameter for the logical storage volume.

6. The method of claim 1, further comprising:
receiving the notification by the real time intrusion detection application; and
evaluating the IO operation by the real time intrusion detection application to determine if the IO operation was authorized;
in response to a determination that the IO operation was authorized, reissuing the IO operation to the storage system with an indication to the atypical access rate detection application that the IO operation was authorized; and
in response to a determination that the IO operation was not authorized, causing the IO operation to fail by the real time intrusion detection application.

7. The method of claim 6, further comprising, in response to a determination that the IO operation was not authorized, instructing by the real time intrusion detection application to the atypical access rate detection application to take protective action to create and/or retain one or more snapshots of a respective logical storage volume associated with the unauthorized IO operation.

8. The method of claim 1, further comprising implementing a two-actor security mechanism at the atypical access rate detection application requiring two-actor concurrence in connection with setting or modifying the atypical access rate detection policy.

9. The method of claim 8, wherein the two-actor security mechanism requires two authenticated and authorized individuals to interact with the atypical access rate detection application in connection with setting or modifying the atypical access rate detection policy used by the atypical access rate detection application to monitor the tracks of physical storage resources.

10. A system for real time intrusion detection, comprising:
one or more physical processors and one or more physical storage devices storing instructions that are operable, when executed by the one or more processors, to cause the one or more processors to perform operations comprising:
defining an atypical access rate detection policy by a real time intrusion detection application executing on a host computer, the atypical access rate detection policy specifying a set of logical storage volumes utilized by the host computer to read and write data to a storage system;
passing the atypical access rate detection policy to an atypical access rate detection application executing on the storage system; and
using the content of the atypical access rate detection policy to monitor physical storage resources allocated by the storage system to be used to store the data of the logical storage volumes;
in response to a determination that an IO operation was received by the storage system on a location of the physical storage resources that is in contravention of the atypical access rate detection policy, blocking the IO operation by the atypical access rate detection application, and notifying the real time intrusion detection application of the occurrence of the IO operation.

11. The system of claim 10, wherein the atypical access rate detection policy includes a set of write monitoring parameters identifying a set of read only logical storage volumes, and wherein the step of monitoring tracks of physical storage resources by the atypical access rate detection application comprises monitoring for occurrence of write operations on respective tracks of the physical storage resources that have been allocated by the storage system to store the set of read only logical storage volumes.

12. The system of claim 11, wherein the set of read only logical storage volumes comprises software library directories and software directories containing software instances used by the host computer.

13. The system of claim 11, wherein monitoring for occurrence of write operations on respective tracks of the physical storage resources that have been allocated by the storage system to store the set of read only logical storage volumes comprises generating a write IO bitmap identifying tracks of physical storage that have received a write IO operation during a preceding time interval, and comparing the write IO bitmap with the respective tracks of the physical storage resources that have been allocated by the storage system to store the set of read only logical storage volumes to detect an anomalous write IO operation.

14. The system of claim 10, wherein the atypical access rate detection policy includes a set of read monitoring parameters identifying the logical storage volumes and respective logical storage volume read IO access rate parameters, and wherein the step of monitoring tracks of physical storage resources by the atypical access rate detection application comprises, for each logical storage volume, monitoring for occurrence of read IO operations on respective tracks of the physical storage resources that have been allocated by the storage system to store the logical storage volume that are in excess of a respective read IO access rate parameter for the logical storage volume.

15. The system of claim 10, the operations further comprising:
  receiving the notification by the real time intrusion detection application; and
  evaluating the IO operation by the real time intrusion detection application to determine if the IO operation was authorized;
  in response to a determination that the IO operation was authorized, reissuing the IO operation to the storage system with an indication to the atypical access rate detection application that the IO operation was authorized; and
  in response to a determination that the IO operation was not authorized, causing the IO operation to fail by the real time intrusion detection application.

16. The system of claim 15, the operations further comprising, in response to a determination that the IO operation was not authorized, instructing by the real time intrusion detection application to the atypical access rate detection application to take protective action to create and/or retain one or more snapshots of a respective logical storage volume associated with the unauthorized IO operation.

17. The system of claim 10, the operations further comprising implementing a two-actor security mechanism at the atypical access rate detection application requiring two-actor concurrence in connection with setting or modifying the atypical access rate detection policy.

18. The system of claim 8, wherein the two-actor security mechanism requires two authenticated and authorized individuals to interact with the atypical access rate detection application in connection with setting or modifying the atypical access rate detection policy used by the atypical access rate detection application to monitor the tracks of physical storage resources.

* * * * *